United States Patent [19]

Sekii

[11] 4,431,103
[45] Feb. 14, 1984

[54] ENGINE POSITIONING DEVICE IN ENGINE TEST DEVICE

[75] Inventor: Tsugio Sekii, Kobe, Japan

[73] Assignee: Mitsubishi Denki Kabushiki Kaisha, Tokyo, Japan

[21] Appl. No.: 316,274

[22] Filed: Oct. 29, 1981

[30] Foreign Application Priority Data

Nov. 14, 1980 [JP] Japan .......................... 55-163733[U]

[51] Int. Cl.³ .............................................. B65G 47/00
[52] U.S. Cl. ..................................... 198/345; 29/33 P
[58] Field of Search ....................... 198/345, 472, 339; 29/33 P, 563; 414/589

[56] References Cited

U.S. PATENT DOCUMENTS

| | | | |
|---|---|---|---|
| 2,970,706 | 2/1961 | Schrecker et al. | 198/472 |
| 3,527,087 | 9/1970 | Converse | 198/472 |
| 3,968,869 | 7/1976 | Stalker | 198/345 |
| 4,014,428 | 3/1977 | Ossbahr | 198/472 |
| 4,133,423 | 1/1979 | Zankl | 198/339 |
| 4,302,919 | 12/1981 | Hartness | 198/345 |

OTHER PUBLICATIONS

"Fully Automated Test Lines Product Group 1 Special Purpose Machine Systems" (Huller, W. Germany).
"Integrated Engine Test Systems" (Advanced Technology & Testing Division of Wilson Engineering, U.S.A.).
"Engine Testing Equipment" (Hot Testing, Cold Testing) (SCANS, U.S.A.).

Primary Examiner—Joseph E. Valenza
Assistant Examiner—Jonathan D. Holmes
Attorney, Agent, or Firm—Oblon, Fisher, Spivak, McClelland & Maier

[57] ABSTRACT

An engine positioning device comprises a transferring conveyer equipped with a lift which transfers an engine; a positioning table which is used for fixing the engine and is placed above the conveyer; cylinders for adjusting the position of the engine both in the conveyor transferring direction and the cross direction; a positioning pin projecting from the positioning table in position to fit a predetermined hole in the engine; and an clamp arm for fixing the engine on the positioning table.

1 Claim, 3 Drawing Figures

ENGINE POSITIONING DEVICE IN ENGINE TEST DEVICE

BACKGROUND OF THE INVENTION

1. Field of the Invention

The present invention relates to an improved structure of an engine positioning device in an engine test device.

2. Description of the Prior Art

FIG. 1 shows a conventional engine positioning device. In FIG. 1, the reference (1) designates a positioning table; (2) a transferring conveyor equipped with a lift; (3) designates an exclusive pallet; (4) designates a clamp device; (5) designates a clamp arm; (6) designates an engine; (10) designates a stopper; (11) designates a positioning pin.

The operation of the conventional engine positioning device will be illustrated.

The transferring conveyer (2) equipped with the lift in the positioning table (1) is placed to be higher than the edges of the positioning pins (11). The exclusive pallet (3) on which the engine (6) is placed is put in the stand by the transferring conveyer (2) equipped with the lift and the exclusive pallet (3) is fixed by a stopper (10) in an entering direction. Then, the transferring conveyer (2) equipped with the lift is lowered to fit the pin (11) of the positioning table (1) to the pin-hole of the exclusive pallet (3) whereby the positioning is completed. Then, the engine (6) is fixed through the clamp arm (5) by the clamping device (4).

The conventional positioning device has the above-mentioned structure. Therefore, the transferring conveyer equipped with the lift should be large size and high accuracy is required for the positioning and many exclusive pallets having high accuracy depending upon number of engines should be prepared. Moreover, the lower surface of the pallet always contacts with the conveyer whereby the lift of the device is disadvantageously low.

SUMMARY OF THE INVENTION

In accordance with the present invention, simple pallets used in an assembling line can be transferred from the line on a conveyor and a positioning is attained on a simple transferring conveyor equipped with a lift without using exclusive pallets and an economical engine positioning device is provided.

DETAILED DESCRIPTION OF THE PREFERRED EMBODIMENTS

The present invention is to overcome the disadvantages of the conventional positioning device and to provide a positioning device which attains the positioning by a simple transferring conveyer equipped with a lift in which simple pallets used in the assembling line are transferred on the conveyer.

Figure 1:
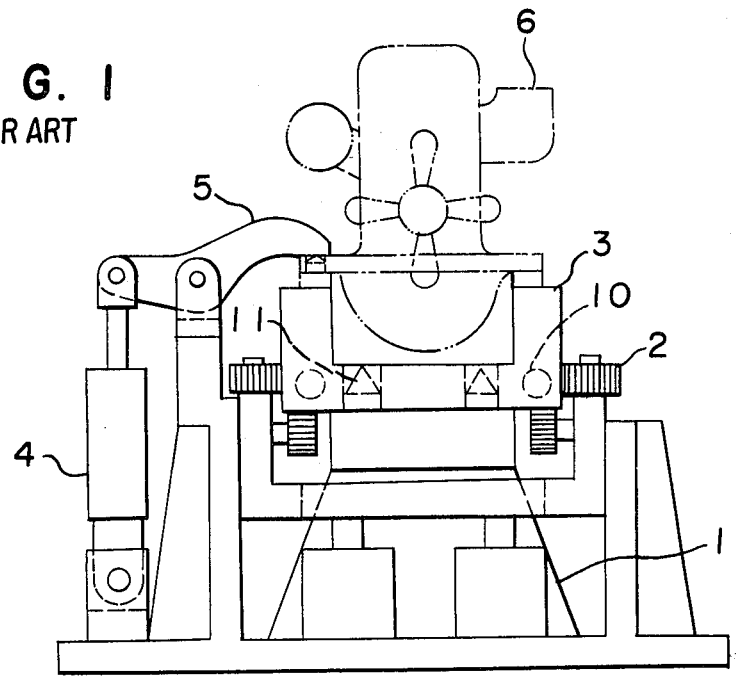
FIG. 1 is a front view of a conventional positioning device.
Figure 2:
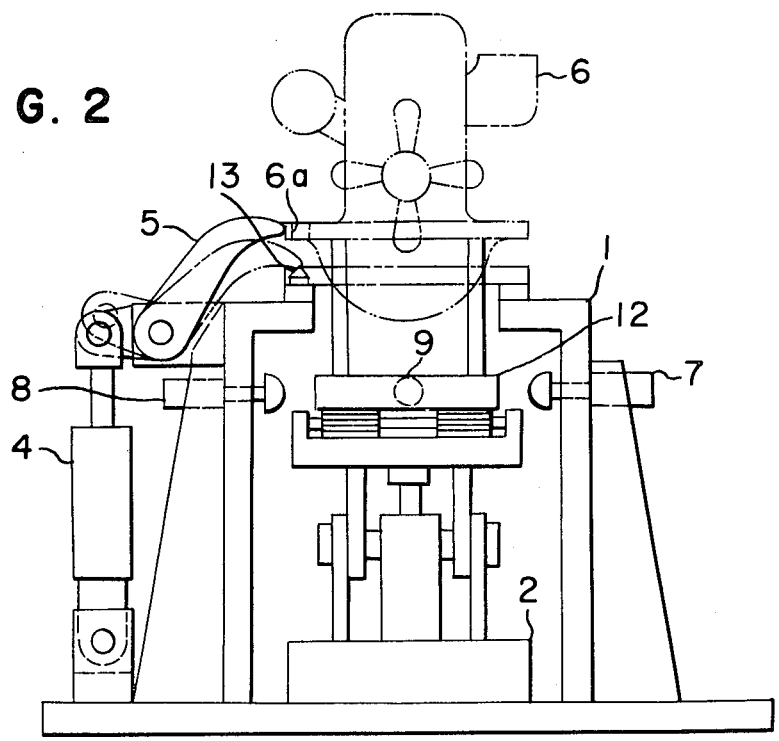
FIG. 2 is a front view of one embodiment of the positioning device according to the present invention.
Figure 3:
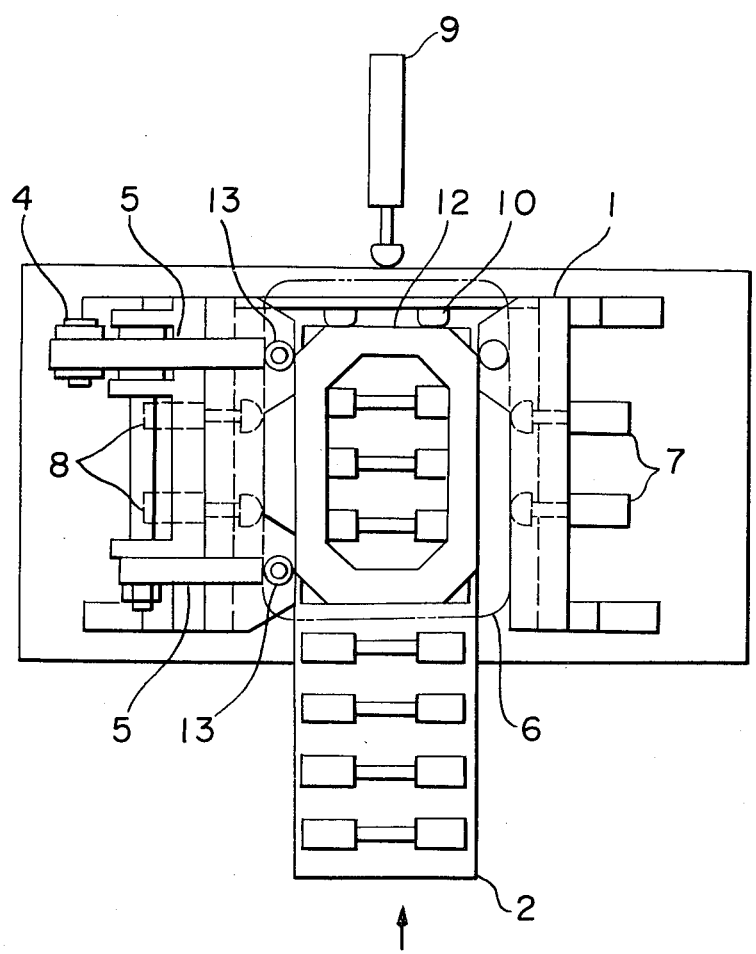
FIG. 3 is a plane view of the positioning device.

Referring to FIGS. 2 and 3, one embodiment of the present invention will be illustrated. In FIGS. 2 and 3, the reference (1) designates a positioning table on which an engine is placed; (2) designates a transferring conveyer equipped with a lift for vertically shifting a simple pallet; (12) designates a simple pallet for carrying an engine; (4) designates a clamping device for fixing an engine; (5) designates a clamp arm; (6) designates an engine; (7) designates a cylinder for transversely pushing an intake manifold side of the pallet; (8) designates a cylinder for transversely pushing an exhaust side of the pallet; (9) designates a cylinder for returning the crank shaft side of the pallet; (10) designates a stopper in an axial direction; (13) designates a positioning pin projecting from the positioning table (1) to fit to the hole (6a) of the engine.

The engine (6) placed on the simple pallet (12) is transferred on the transferring conveyer (2) equipped with the lift to be freely taken in the positioning table (1). The transferring conveyer (2) equipped with the lift is set in a height for transferring. Then, the simple pallet (12) stops by the stopper (10) of the positioning table (1).

The positioning of the engine (6) is attained by the following steps.

(1) The axial side cylinder (9) is operated to return the simple pallet (12) to a predetermined position in the axial direction;

(2) The exhaust side cylinder (8) is operated to push the simple pallet (12) in the intake side;

(3) The clamp arm of the clamping device (4) is stopped in the middle to place the end surface of the clamp arm (5) at the end surface for positioning the engine;

(4) The intake side cylinder (7) is operated to return the engine (6) at the position contacting the engine with the end surface of the clamp arm (5);

(5) The transferring conveyer (2) equipped with the lift is lowered to fit the positioning pin (13) to the hole (6a) of the engine; and (6) The clamping device (4) is operated to clamp the engine.

After positioning the engine (6) by the above-mentioned steps, the engine (6) is fixed on the positioning table (1) by the clamp arm (5).

In the embodiment, the engine on the simple pallet is positioned and clamped as shown in FIGS. 2 and 3. However, in the case of positioning of a product without using a simple pallet, it is possible to vary forces of the cylinders in the intake side and the exhaust side to attain the positioning by five cylinders followed by the clamping.

In accordance with the present invention, it is not necessary to use the transferring conveyer equipped with the lift having high accuracy and many exclusive pallets as required in the conventional positioning device and it is possible to easily attain the positioning with simple pallets. The positioning device can be economical.

I claim:

1. An engine positioning device comprising:
   (a) a transferring conveyor adapted to move rectangular pallets in a predetermined direction;
   (b) a positioning table on which engines may be releasably fixed, said positioning table being disposed above said transferring conveyor;
   (c) a plurality of positioning pins projecting upwardly from said positioning table, said positioning pins defining the work position of said engine positioning device;

(d) a stopper for stopping a pallet being transferred on said transferring conveyor at a position slightly downstream of the work position;
(e) a return cylinder for adjusting the longitudinal position of the pallet on said transferring conveyor in the direction opposite to the predetermined direction;
(f) a pair of spaced transverse cylinders on each side of the work position for adjusting the transverse position and angular orientation of the pallet on said transferring conveyor;
(g) said return cylinder and said pairs of spaced transfer cylinders being usable to precisely position a plurality of holes in an engine carried by the pallet over said plurality of positioning pins;
(h) a lift for lowering said transfering conveyor after the pallet has been precisely positioned by said return cylinder and said pairs of spaced transfer cylinders such that said plurality of positioning pins are accepted in the holes in the engine; and
(i) a clamping mechanism for releasably clamping the engine to said positioning table.

* * * * *